United States Patent
Kim et al.

(10) Patent No.: US 9,046,954 B2
(45) Date of Patent: Jun. 2, 2015

(54) DISPLAY DEVICE INTEGRATED WITH TOUCH SCREEN AND METHOD OF DRIVING THE SAME

(71) Applicant: LG Display Co., Ltd., Seoul (KR)

(72) Inventors: Sung Chul Kim, Gyeonggi-do (KR); Seung Eun Pyo, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/047,122

(22) Filed: Oct. 7, 2013

(65) Prior Publication Data
US 2014/0210771 A1    Jul. 31, 2014

(30) Foreign Application Priority Data
Jan. 30, 2013   (KR) .......................... 10-2013-0010599

(51) Int. Cl.
*G06F 3/045*      (2006.01)
*G06F 3/041*      (2006.01)
*G06F 3/044*      (2006.01)

(52) U.S. Cl.
CPC .............. *G06F 3/0412* (2013.01); *G06F 3/044* (2013.01)

(58) Field of Classification Search
USPC .......................... 345/174, 87, 204, 92; 257/59
See application file for complete search history.

(56) References Cited

U.S. PATENT DOCUMENTS

2010/0013791 A1*  1/2010  Haga et al. .................... 345/174
2011/0316809 A1* 12/2011  Kim et al. ..................... 345/174
2012/0242597 A1*  9/2012  Hwang et al. ................ 345/173

* cited by examiner

*Primary Examiner* — Shaheda Abdin
(74) *Attorney, Agent, or Firm* — Morgan, Lewis & Bockius LLP (57) ABSTRACT

Disclosed are a display device integrated with a touch screen and a method of driving the same, the display device comprising: a touch panel comprising a touch electrode which is disposed in each of a plurality of pixels defined by intersections between a plurality of gate lines and a plurality of data lines; a display driver supplying data voltages for displaying an image to the respective pixels during a display period, and supplying an initialization data voltage for initializing a capacitance of the touch electrode to each pixel during a touch sensing period; and a touch driver sensing the capacitance of the touch electrode to detect a touched position during the touch sensing period. The display device integrated with the touch screen and the method of driving the same according to the present invention initialize capacitances of the touch electrodes to the same value irrespective of image data of the pixels being changed from black to white during the display period, thus preventing the occurrence of a touch error due to a screen change.

12 Claims, 8 Drawing Sheets

FIG. 1

[ Related Art ]

FIG. 2

[ Related Art ]

FIG. 3

[ Related Art ]

- Sense RC delay difference Between touch and no touch
- $\Delta t$ > Touch Threshold → Touch Sensing

$$t = RC \ln\left(\frac{V_0}{V_x}\right)$$

$$\Delta t = RC_f \ln\left(\frac{V_0}{V_x}\right)$$

$C_f$ : Finger cap

[ Related Art ]

DISPLAY DEVICE INTEGRATED WITH TOUCH SCREEN AND METHOD OF DRIVING THE SAME

CROSS-REFERENCE TO RELATED APPLICATIONS

This application claims the benefit of the Korean Patent Application No. 10-2013-0010599 filed on Jan. 30, 2013, which is hereby incorporated by reference as if fully set forth herein.

BACKGROUND

1. Field of the Invention

The present invention relates to a display device integrated with a touch screen and a method of driving the same, which can enhance touch sensing performance by reducing sensing-signal noise caused by the display driving of an in-cell touch panel.

2. Discussion of the Related Art

Instead of a mouse or a keyboard which is conventionally applied to flat panel display devices, a touch screen (touch sensor) that enables a user to directly input information with a finger or a pen is applied to the flat panel display devices.

A touch screen is applied to monitors such as navigations, industrial terminals, notebook computers, financial automation equipment, and game machines, portable terminals such as portable phones, MP3 players, PDAs, PMPs, PSPs, portable game machines, DMB receivers, and tablet personal computers (PCs), and home appliances such as refrigerators, microwave ovens, and washing machines. Especially, since all users can easily manipulate the touch screen, the application of the touch screen is being expanded.

General touch panels calculate touch coordinates with signals generated by a touch. However, noise caused by the ambient environment of a touch panel makes touch sensing itself difficult, and acts as a cause that makes it difficult to calculate accurate touch coordinates even though a touch is sensed. Since it is practically impossible to perfectly avoid noise, a method for reducing noise occurring in a touch panel is needed.

Recently, in applying the touch screen to display devices, the application of an in-cell type where the touch screen is built in a display panel for slimming is increasing. In such in-cell touch panels, however, noise (caused by display driving) inside a cell as well as noise due to an external cause affect touch driving.

Figure 1:
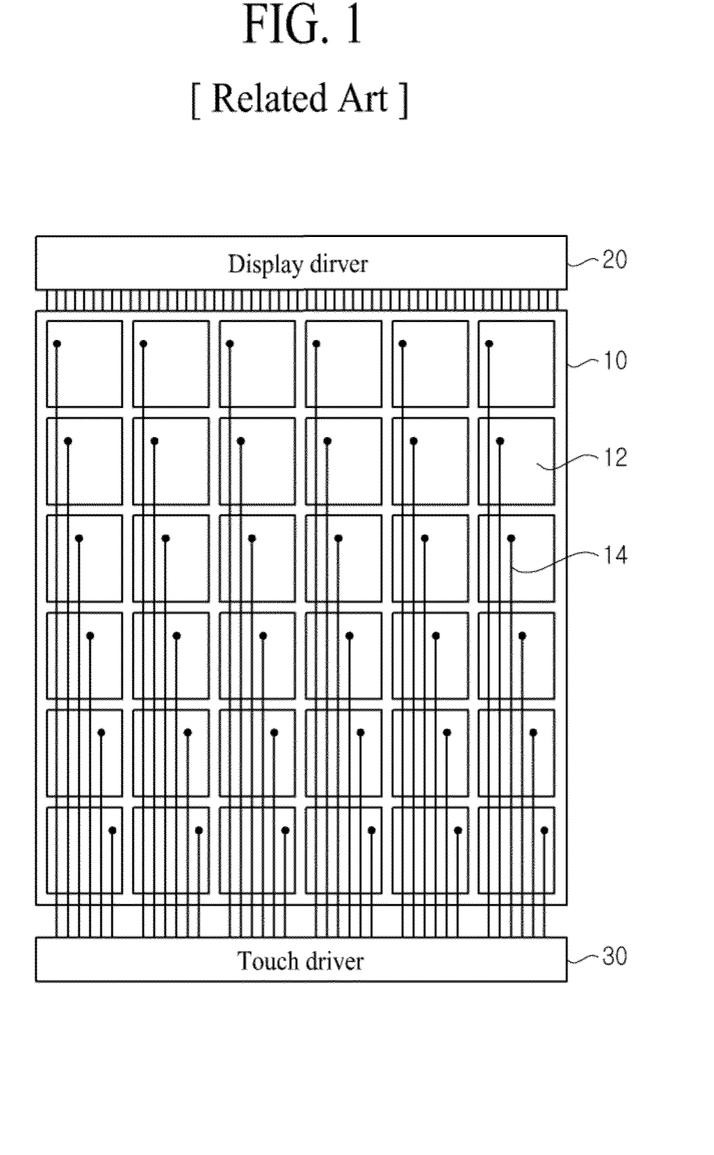
FIG. 1 is a diagram schematically illustrating a related art display device including a touch screen.
Figure 2:
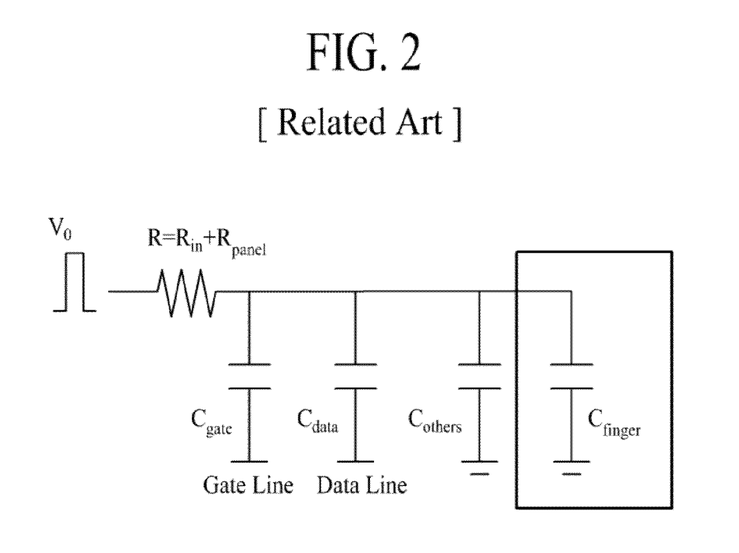
FIG. 2 is a diagram illustrating an equivalent circuit of a self in-cell touch panel of the related art.

FIG. 1 is a diagram schematically illustrating a related art display device including a touch screen. FIG. 2 is a diagram illustrating an equivalent circuit of a self in-cell touch panel of the related art.

Referring to FIGS. 1 and 2, the related art display device including the touch screen includes a touch panel 10, a display driver 20, and a touch driver 30.

The touch panel 10 includes a touch screen in which a plurality of touch groups are provided, in which case a touch group 12 is provided in units of a certain number of pixels (for example, 64×64 pixels).

A common electrode receiving a common voltage (Vcom) is disposed in each of a plurality of pixels in each touch group 12 of the touch panel 10. In this case, the common electrodes of the respective pixels are used as touch electrodes. In the touch groups 12, the common electrodes are connected to the touch driver 30 through separate touch lines (not shown), and driven as the touch electrodes, thereby sensing a user's touch.

Figure 3:
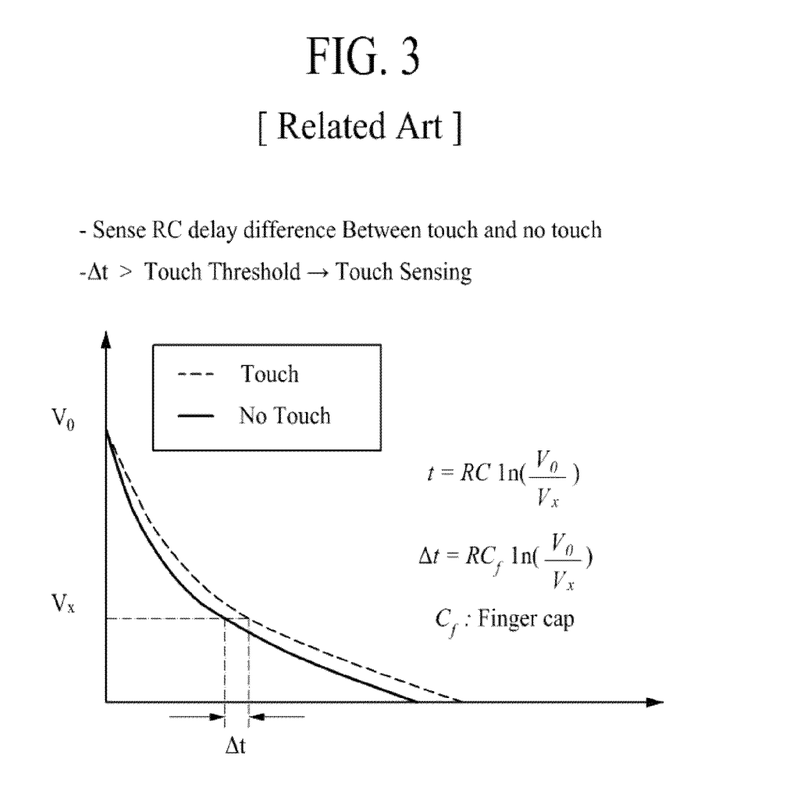
FIG. 3 is a diagram for describing a touch sensing method of a touch panel of the related art.
Figure 4:
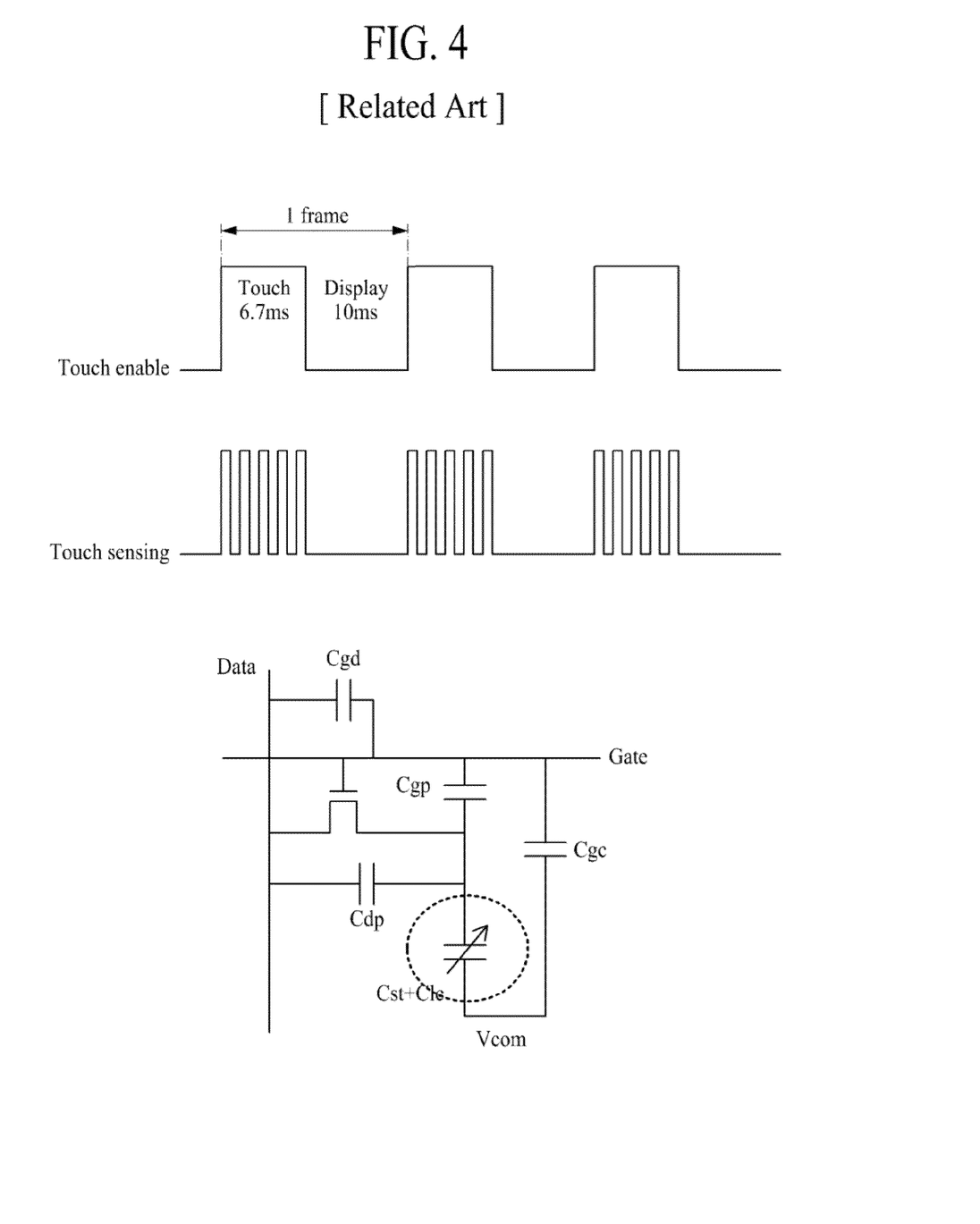
FIG. 4 is a diagram for describing the touch sensing method of the touch panel of the related art.

FIGS. 3 and 4 are diagrams for describing a touch sensing method of a touch panel of the related art.

Referring to FIGS. 3 and 4, an in-cell type touch panel has a structure in which a plurality of pixels for display and a touch screen for touch detection are provided together. Due to such a structural characteristic, display and touch sensing are temporally divided and performed.

Specifically, the touch panel determines whether there is a touch and a touched position by using a capacitance differential between adjacent touch groups. A capacitance differential occurs between a touch block touched by a user's finger and an untouched touch block during a touch sensing period (non-display period). The touch driver 30 detects a capacitance differential between adjacent touch blocks (touch groups) 12 to determine whether there is a touch and a touched position.

In detail, touch sensing may be performed in a self touch sensing type. Each of the touch blocks detects an RC delay difference ($\Delta t$) between a touched state and an untouched state. When the RC delay difference ($\Delta t$) between adjacent touch blocks is equal to or greater than a threshold value, the touch driver 30 determines there to be a touch.

In such a self touch sensing type, a display period and a touch sensing period are divided, and display and touch sensing are performed, in one frame. For this reason, it is unable to sufficiently secure a time for display driving and touch-sensing driving.

Figure 5:
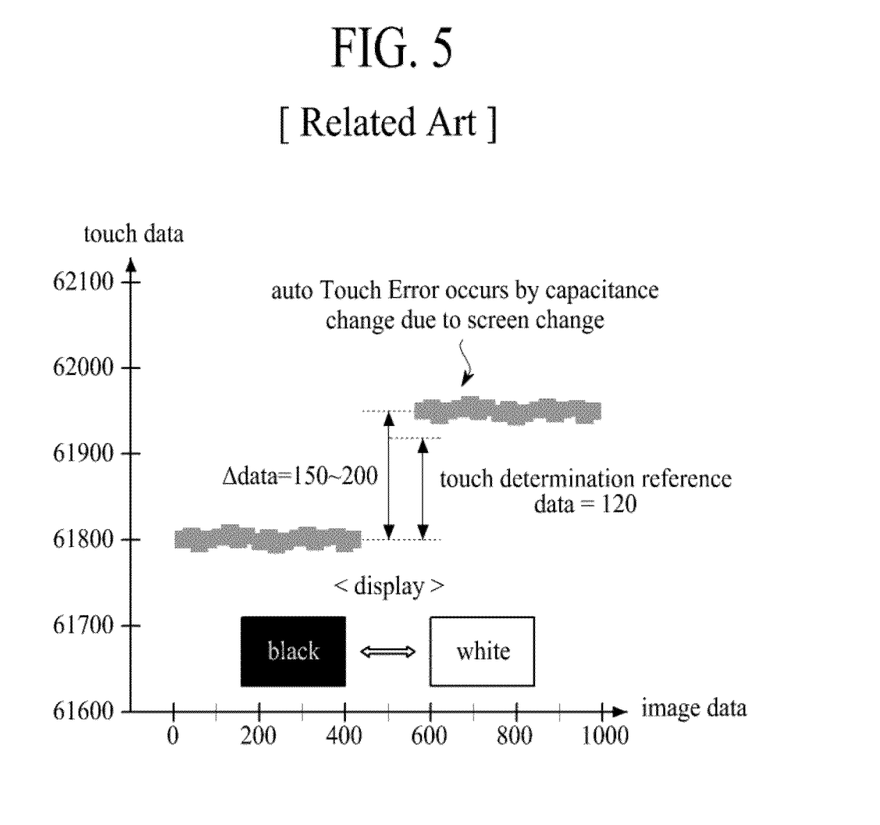
FIG. 5 is a diagram showing problems in which touch errors are caused by display driving in the related art display device including the touch screen.

FIG. 5 is a diagram showing problems in which touch errors are caused by display driving in the related art display device including the touch screen.

To provide a description with reference to FIG. 5, since liquid crystal has an anisotropic characteristic, the permittivity of the liquid crystal varies depending on a viewing direction, and thus, a capacitance is changed. For example, when a pattern of an image corresponds to a black image, the permittivity of the liquid crystal becomes lower, causing a reduction in a parasitic capacitance. On the other hand, when a pattern of an image corresponds to a white image, the permittivity of the liquid crystal becomes higher, causing an increase in a parasitic capacitance.

Like this, as an image pattern is changed, parasitic capacitances generated in the touch panel are changed, causing ghost-touch noise. Due to the ghost-touch noise, it is unable to accurately detect an actually touched position.

Moreover, an auto-touch error in which a touch is sensed even when there is no actual touch occurs. In detail, as a capacitance change due to noise caused by a screen change becomes greater than a level change of touch raw data, the capacitance change exceeds a touch threshold value, and thus, a touch is sensed even though there is no actual touch.

There is a high probability that the ghost-touch error and the auto-touch error occur when an image pattern of the same touch block is changed from black to white. Furthermore, even when image patterns of adjacent touch blocks differ, the occurrence probabilities of the ghost-touch error and auto-touch error becomes higher.

SUMMARY

Accordingly, the present invention is directed to provide a display device integrated with a touch screen and a method of driving the same that substantially obviate one or more problems due to limitations and disadvantages of the related art.

An aspect of the present invention is directed to provide a display device integrated with a touch screen and a method of driving the same, which can reduce or remove the influence of touch noise due to display driving.

Another aspect of the present invention is directed to provide a display device integrated with a touch screen and a method of driving the same, which reduce or remove touch noise due to a change in an image pattern, thus enhancing touch sensing performance.

Another aspect of the present invention is directed to provide a display device integrated with a touch screen and a method of driving the same, which reduce or remove ghost-touch noise due to a change in an image pattern, thus enhancing touch sensing performance.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device integrated with a touch screen which includes: a touch panel including a touch electrode which is disposed in each of a plurality of pixels defined by intersections between a plurality of gate lines and a plurality of data lines; a display driver supplying data voltages for displaying an image to the respective pixels during a display period, and supplying an initialization data voltage for initializing a capacitance of the touch electrode to each pixel during a touch sensing period; and a touch driver sensing the capacitance of the touch electrode to detect a touched position during the touch sensing period.

In another aspect of the present invention, there is provided a method of a display device, in which a touch electrode is provided in each of a plurality of pixels of a touch panel, including: turning on the pixels to supply data voltages for image display to the respective pixels during a display period in one frame; grouping a plurality of gate lines in units of a certain number of gate lines to supply a scan signal to the grouped gate lines during a touch sensing period in one frame, the plurality of gate lines being provided in the touch panel; supplying an initialization data voltage for initializing a capacitance of the touch electrode to pixels turned on by the scan signal during the touch sensing period; and sensing the capacitance of the touch electrode to detect a touched position during the touch sensing period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Before providing a detailed description with reference to the drawings, LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystal.

Among the modes, the IPS mode and the FFS mode are modes in which a plurality of pixel electrodes and common electrode are arranged on a lower substrate (TFT array substrate), and the alignment of liquid crystal is adjusted by vertical electric fields between the pixel electrodes and the common electrodes.

Especially, the IPS mode is a mode in which a plurality of pixel electrodes and common electrodes are alternately arranged in parallel, and horizontal electric fields are respectively generated between the pixel electrodes and the common electrodes, thereby adjusting the alignment of liquid crystal.

The FFS mode is a mode in which a pixel electrode and a common electrode is formed in plurality to be separated from each other with an insulating layer therebetween. In this case, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A TN-mode liquid crystal panel, a VA-mode liquid crystal panel, an IPS-mode liquid crystal panel, and an FFS-mode liquid crystal panel may be applied to a display device integrated with touch screen according to an embodiment of the present invention. In a detailed description on the present invention, as an example, an FFS-mode liquid crystal panel integrated with touch screen displays an image and senses a touch.

Hereinafter, a display device integrated with a touch screen and a method of driving the same according to embodiments of the present invention will be described in detail with reference to the accompanying drawings.

Figure 6:
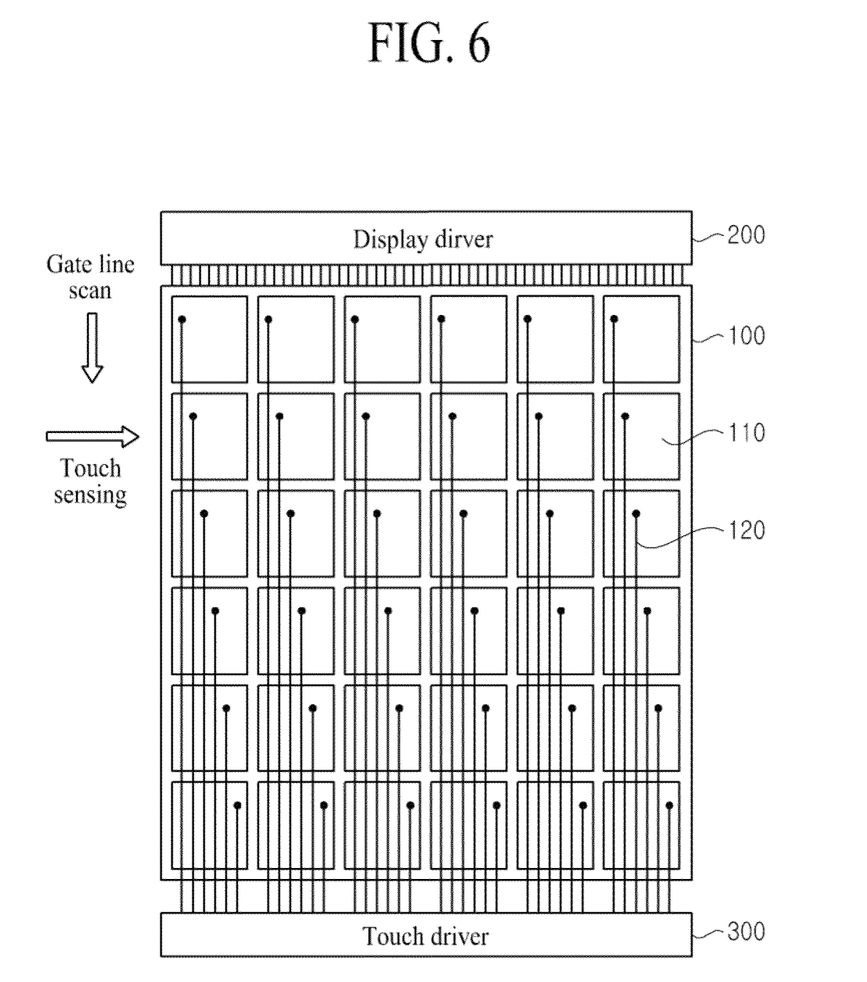
FIG. 6 is a diagram schematically illustrating a display device integrated with a touch screen according to an embodiment of the present invention.
Figure 7:
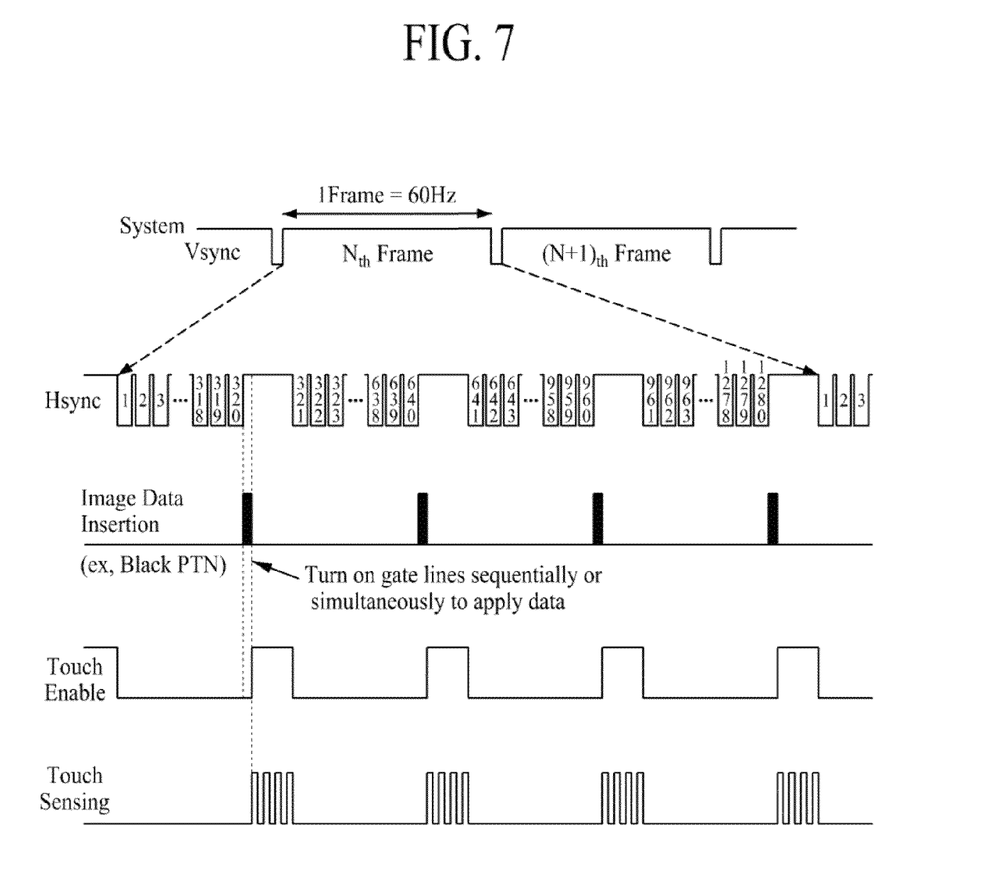
FIG. 7 is a diagram illustrating a display driver according to an embodiment of the present invention.

FIG. 6 is a diagram schematically illustrating a display device integrated with a touch screen according to an embodiment of the present invention. FIG. 7 is a diagram illustrating a display driver according to an embodiment of the present invention.

Referring to FIGS. 6 and 7, the display device integrated with the touch screen according to an embodiment of the present invention includes a touch panel 100, a display driver 200, and a touch driver 300. The display driver 200 and the touch driver 300 may be provided separately, or integrated into a single chip.

Although not shown, the display device integrated with the touch screen according to an embodiment of the present invention includes a backlight unit (not shown) that supplies light to the touch panel 100. Also, the display device integrated with the touch screen according to an embodiment of the present invention includes a power supply (not shown) that supplies driving power to a plurality of backlight driving circuits.

The touch panel 100 is configured by the combination of a touch screen and a display panel displaying an image, and may be configured in an in-cell type in which the touch screen is built in a cell of the display panel.

The touch panel 100 includes an upper substrate (color filter array substrate), a lower substrate (TFT array substrate), and a liquid crystal layer disposed between the upper substrate and the lower substrate.

A plurality of gate lines and a plurality of data lines are arranged to intersect each other in the lower substrate of the touch panel 100, and a plurality of pixels are defined by intersections between the gate lines and the date lines.

The plurality of pixels are arranged in a matrix type, and one pixel may be composed of three sub-pixels RGB or four sub-pixels RGBW. Each of the sub-pixels includes a thin film transistor (TFT) that is a switching element, a storage capacitor, a pixel electrode, and a common electrode. Here, the common electrode may be provided in units of one pixel, or provided in units of a group consisting of a plurality of pixels.

Here, when an image is displayed with a vertical electric field like the TN mode and the VA mode, the common electrodes are disposed in the upper substrate. On the other hand, when an image is displayed with a lateral electric field or a fringe field like the IPS mode or the FFS mode, the common electrodes are disposed in the lower substrate.

The alignment of liquid crystal is adjusted with electric fields that are generated by data voltages supplied to the respective pixel electrodes and a common voltage (Vcom) supplied to the common electrodes. Transmittance of light irradiated from the backlight unit is adjusted by adjusting the alignment of the liquid crystal, thereby realizing an image.

A certain number of pixels (for example, 64Δ64 pixels) constitute one touch group 120. A plurality of the touch groups 120 configure a touch screen. The common electrode is disposed in each of the touch groups 120. The common electrodes of the respective touch groups 120 are connected to the touch driver (touch IC) 300 through separate touch lines (not shown).

The touch panel 100 is implemented by the integration of the pixels for display and the touch screen for touch detection in an in-cell touch type. Thus, display driving and touch sensing are temporally divided and driven.

During a display period, data voltages corresponding to image data are supplied to the respective pixel electrodes of the pixels. The common voltage is supplied to the common electrode that is provided in units of touch group (touch block) 120, thereby displaying an image.

During a non-display period, the common electrode of the touch block 120 is driven as a touch electrode to sense a user's touch.

The display driver 200 includes a timing controller 210, a gate driver 220, and a data driver 230.

Here, when the display touch panel 100 is manufactured in a small size and applied to a mobile device, the timing controller 210, the gate driver 220, and the data driver 230 may be integrated into a single chip.

On the other hand, when a liquid crystal display (LCD) device is manufactured in a medium or large size and applied to a monitor or a television (TV), the gate driver 220 may be integrated in an amorphous silicon gate (ASG) type or a gate-in panel (GIP) type, on a substrate of a liquid crystal panel. Also, the timing controller 210 and the data driver 230 may be provided as separate chips, or some elements may be implemented as a single chip.

An in-cell touch panel that senses a touch in a capacitive type shares the common electrodes of the pixels as electrodes for display and touch electrodes. Therefore, a capacitance of a touch electrode is changed by a data voltage applied to a pixel for image display during the display period.

Like this, data voltages corresponding to an image directly affect touch sensing. Particularly, a capacitance of a touch electrode is greatly changed when a black image is changed to a white image or a white image is changed to a black image. Such a capacitance change due to an image change also exerts influence on a case which displays a specific grayscale image.

For this reason, the initial capacitance of a touch electrode is changed irrespective of whether there is no touch, and, when a changed capacitance value is greater than a threshold value for touch determination, an error occurs in touch sensing.

To prevent the occurrence of the error in touch sensing, by supplying data voltages to respective pixels even during a touch sensing period in one frame, the present invention reduces or removes a capacitance change due to each of the data voltages supplied to the respective pixels for displaying an image.

Figure 8:
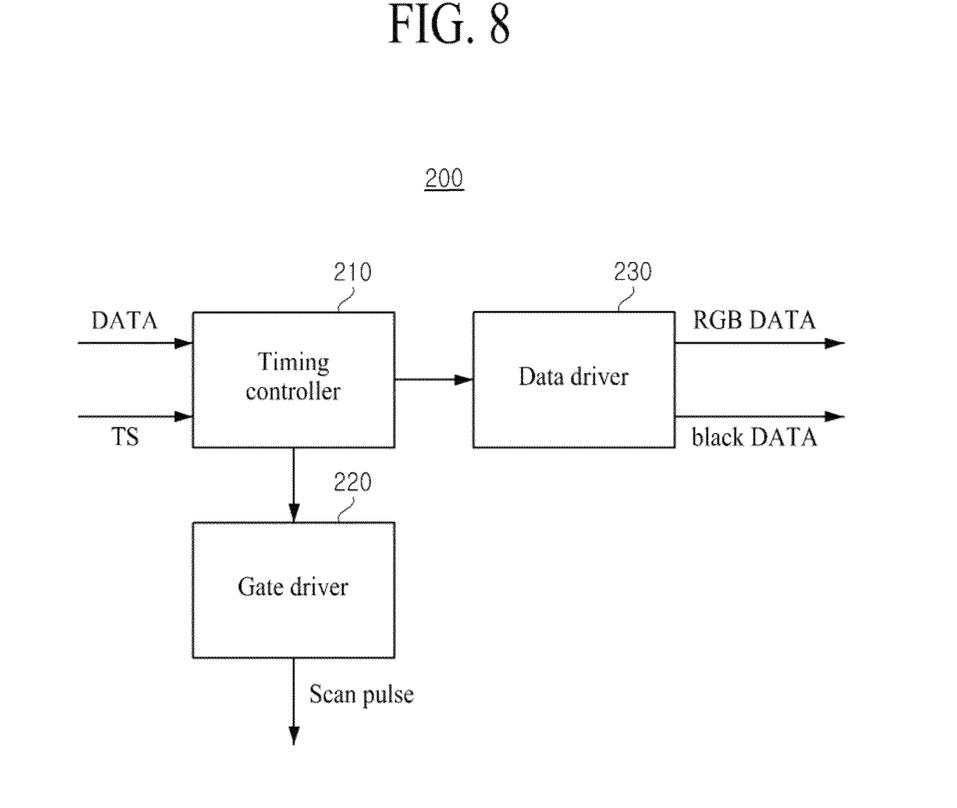
FIG. 8 is a diagram for describing the display device integrated with the touch screen and a method of driving the same according to an embodiment of the present invention.

FIG. 8 is a diagram for describing the display device integrated with the touch screen and a method of driving the same according to an embodiment of the present invention. Hereinafter, a method of driving the display driver 200 and touch driver 300 of the display device integrated with the touch screen according to an embodiment of the present invention will be described in detail with reference to FIG. 8.

The timing controller 210 aligns and converts input video signals DATA into frame-unit digital RGB image data, and supplies the converted image data to the data driver 230.

Moreover, the timing controller 210 generates a gate control signal GCS for controlling the gate driver 220 and a data control signal DCS for controlling the data driver 230 with an input timing signal TS. The timing signal TS includes a vertical sync signal Vsync, a horizontal sync signal Hsync, and a clock signal CLK. The gate control signal GCS is supplied to the gate driver 220, and the data control signal DCS is supplied to the data driver 230.

The data control signal DCS may include a source start pulse SSP, a source sampling clock SSC, a source output enable single SOE, and a polarity control signal POL.

The gate control signal GCS may include a gate start pulse GSP, a gate shift clock GCS, and a gate output enable signal GOE.

The gate driver 220 generates a scan signal (gate driving signal) for driving the TFTs included in the respective pixels of the touch panel 100, on the basis of the gate control signal GCS supplied from the timing controller 210. The gate driver 220 sequentially supplies the scan signal to the gate lines disposed in the touch panel 100 to drive the TFTs of the respective pixels.

Here, the gate driver 220 supplies the scan signal for displaying an image to the touch panel 100 during the display period in one frame.

Moreover, the gate driver 220 sequentially supplies the scan signal to one or more of all the gate lines during the touch sensing period in one frame.

However, the present invention is not limited thereto, and as another example, the gate driver 220 may simultaneously supply the scan signal to one or more of all the gate lines during the touch sensing period in one frame.

For example, the plurality of gate lines may be grouped in units of 320 gate lines, and the gate driver 220 may sequentially or simultaneously supply the scan signal to a 1st gate line to a 320th gate line to turn on pixels respectively connected to the 1st gate line to the 320th gate line.

Subsequently, the gate driver 220 may sequentially or simultaneously supply the scan signal to pixels in units of 320 gate lines, thereby turning on pixels respectively connected to a 321st gate line to a 640th gate line.

Identically to the above-described scheme, the gate driver 220 may sequentially or simultaneously supply the scan signal to pixels respectively connected to a 641st gate line to a 960th gate line and a 961st gate line to a 1280th gate line in units of 320 gate lines, thereby turning on the pixels.

Here, touch sensing may be performed in units of Hsync, and performed in a gate line direction. A plurality of gate lines, receiving the scan signal during the touch sensing period, may be grouped according to the horizontal sync signal Hsync.

As another example, touch sensing may be performed in units of Hsync, and performed in a data line direction. A plurality of gate lines, receiving the scan signal during the touch sensing period, may be grouped according to the horizontal sync signal Hsync.

In the above-described embodiment, it has been described that the plurality of gate lines disposed in the touch panel 100 are grouped in units of 320 gate lines and receive the scan signal during the touch sensing period. However, the present invention is not limited thereto, and the number of gate lines constituting one group may be appropriately adjusted according to the touch sensing period.

The data driver 230 converts digital image data R, G and B, supplied from the timing controller 210, into analog data voltages (data signals) with gamma voltages GMA. The data driver 230 respectively supplies the data voltages to the plurality of pixels through the data lines of the touch panel 100 during the display period in one frame, according to the data control signal DCS from the timing controller 210. Also, the data driver 230 generates the common voltage (Vcom) and supplies the common voltage to the plurality of touch blocks 120, thereby enabling the display of an image.

The data driver 230 sequentially supplies an initialization data voltage to pixels that are turned on by the scan signal during the touch sensing period in one frame. The initialization data voltage is supplied for reducing or removing the influences of data voltages that have been supplied for displaying an image during the display period.

Here, the initialization data voltage is for reducing or removing a capacitance differential due to the data voltages (supplied to the respective pixels during the display period) and an image change, and data voltages of the same image pattern are supplied to the respective pixels that are turned on by the scan signal during the touch sensing period.

Since touch sensing is performed in the gate line direction, data voltages of a black image may not simultaneously be supplied to all the pixels during the touch sensing period. The data voltages corresponding to the black image may be supplied to respective pixels connected to gate lines receiving the scan signal during the touch sensing period, identical capacitance may be generated in the touch electrodes of the pixels. That is, a capacitance may be initialized to a certain value by supplying the same initialization data voltage to the pixels irrespective of the data voltages supplied to the pixels for displaying an image.

At this point, the initialization data voltage is supplied before touch sensing is started, and, when touch sensing is performed, capacitances of pixels are initialized to the same value by the initialization data voltage. Like this, at an initial stage of the touch sensing period, data of a black image are identically supplied to pixels including touch electrodes in which touch sensing is performed, thereby removing a change in a parasitic capacitance.

For example, when the plurality of gate lines are grouped in units of 320 gate lines and receive the scan signal, data voltages of a black image are simultaneously supplied to the respective pixels connected to the 1st gate line to the 320th gate line.

The data voltages of the black image are sequentially supplied to the respective pixels connected to the 321st gate line to the 640th gate line, the 641st gate line to the 960th gate line, and the 961st gate line to the 1280th gate line.

Like this, by supplying the initialization data voltage of the black image to the pixels during the touch sensing period, capacitances and parasitic capacitances of the touch electrodes may be initialized irrespective of a grayscale image pattern of the display period.

However, the present invention is not limited thereto, and as another example, by supplying the initialization data voltage of the black image and moreover supplying data voltages of a specific grayscale image pattern as initialization data voltage, capacitances and parasitic capacitances of the pixels may be initialized.

As described above, capacitances of the pixels are changed by data voltages for displaying an image and a screen change, causing a malfunction in touch sensing.

During the touch sensing period, the present invention supplies the same black-image data as initialization data voltage to the pixels before touch sensing is performed, thereby initializing the capacitances of the pixels. Accordingly, the occurrence of an auto-touch error can be prevented by compensating for capacitance changes of the pixels due to display driving and a screen change.

The touch driver 300 supplies a touch driving signal for touch detection to the plurality of touch electrodes disposed in the touch panel 100. Then, the touch driver 300 senses capacitance changes of the touch electrodes with received sensing signals to detect a touched position.

At this point, the touch driver 300 sequentially supplies the touch driving signal to the touch electrodes disposed in the touch panel 100. The touch driver 300 senses a capacitance change with the sensing signals received from the touch panel 100 to determine whether there is a touch or a touched position. However, the present invention is not limited thereto, and a scheme of inputting a signal to a driving electrode and a scheme of sensing a capacitance change of a receiving electrode are not limited.

Figure 9:
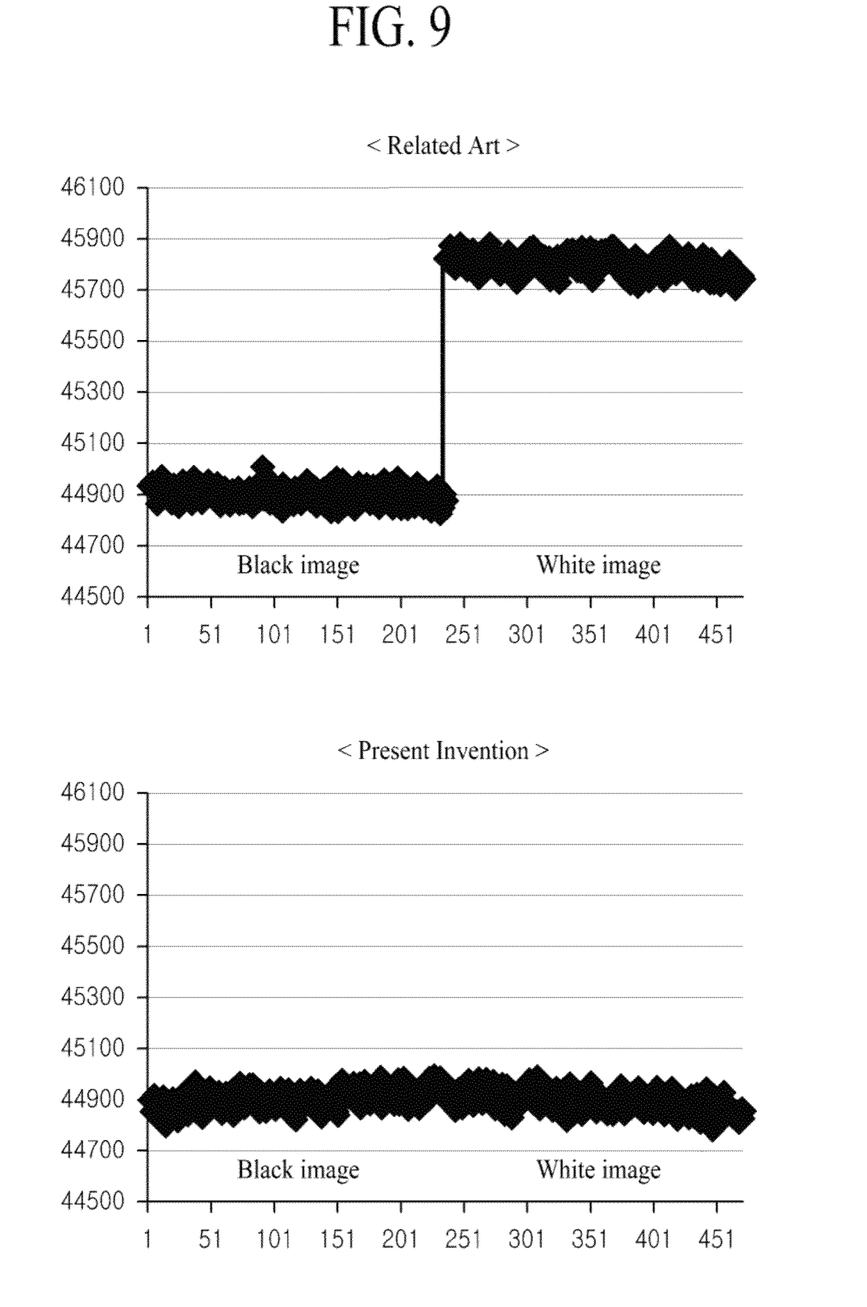
FIG. 9 is diagrams showing effects in which touch sensing performance is enhanced by reducing touch noise due to display driving, irrespective of an image pattern.

FIG. 9 is diagrams showing effects in which touch sensing performance is enhanced by reducing touch noise due to display driving, irrespective of an image pattern.

Referring to FIG. 9, in the related art, when a black image is changed to a white image, a capacitance of a touch electrode is changed, and thus, an error occurs in touch data. For this reason, a touch can be sensed even when there is no actual touch.

On the other hand, the display device integrated with the touch screen and the method of driving the same according to the embodiments of the present invention initialize capacitances of the touch electrodes to the same value irrespective of image data of the pixels being changed from black to white during the display period, thus preventing the occurrence of a touch error due to a screen change.

Moreover, the present invention removes power noise due to 60 Hz, 120 Hz, or 240 Hz driving as well as noise due to data voltages of an image, thus increasing the accuracy of touch sensing.

As described above, the display device integrated with the touch screen and the method of driving the same according to the embodiments of the present invention reduce or remove the influence of touch noise due to display driving.

Moreover, the display device integrated with the touch screen and the method of driving the same according to the embodiments of the present invention reduce or remove touch noise due to a change in an image pattern, thus enhancing touch sensing performance.

Moreover, the display device integrated with the touch screen and the method of driving the same according to the embodiments of the present invention reduce or remove ghost-touch noise due to a change in an image pattern, thus enhancing touch sensing performance.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device integrated with a touch screen, comprising:
   a touch panel comprising a touch electrode which is disposed in each of a plurality of pixels defined by intersections between a plurality of gate lines and a plurality of data lines;
   a display driver configured to supply data voltages through the data lines to the respective pixels,
   wherein during a display period, the display driver is configured to supply data voltages for displaying an image to the respective pixels;
   wherein during a touch sensing period subsequent to the display period, the display driver is configured to supply an initialization data voltage to each pixel before detecting a touched position, wherein the initialization data voltage initializes a capacitance of the touch electrode; and
   a touch driver configured to sense the capacitance of the touch electrode to detect the touched position during the touch sensing period after the display driver has supplied the initialization data voltage to each pixel,
   wherein the touch electrode is driven as a common electrode during the display period.

2. The display device of claim 1, wherein the display driver comprises a gate driver grouping the plurality of gate lines in units of a certain number of gate lines, and supplying a scan signal to the grouped gate lines, during the touch sensing period.

3. The display device of claim 2, wherein the gate driver groups the plurality of gate lines and supplies the scan signal to the grouped gate lines according to a horizontal sync signal during the touch sensing period.

4. The display device of claim 2, wherein the display driver comprises a data driver supplying the initialization data voltage to pixels connected to gate lines receiving the scan signal during the touch sensing period.

5. The display device of claim 4, wherein the data driver respectively supplies data voltages representing a grayscale image pattern to the pixels connected to the gate lines receiving the scan signal during the touch sensing period.

6. The display device of claim 5, wherein during the touch sensing period, the data driver supplies the same data voltage to the pixels connected to the gate lines receiving the scan signal to initialize capacitances of the pixels, connected to the gate lines receiving the scan signal, to the same value.

7. The display device of claim 4, wherein the data driver respectively supplies data voltages representing a black image pattern to the pixels connected to the gate lines receiving the scan signal during the touch sensing period.

8. The display device of claim 1, wherein the initialization data voltage represents a black image pattern.

9. A method of driving a display device in which a touch electrode is provided in each of a plurality of pixels of a touch panel, the method comprising:
   turning on the pixels to supply data voltages for image display through data lines to the respective pixels during a display period in one frame;
   grouping a plurality of gate lines in units of a certain number of gate lines to supply a scan signal to the grouped gate lines during a touch sensing period in one frame, the plurality of gate lines being provided in the touch panel;
   subsequent to the display period, supplying an initialization data voltage for initializing a capacitance of the touch electrode to pixels turned on by the scan signal during the touch sensing period before detecting a touched position; and
   after supplying the initialization data voltage, sensing the capacitance of the touch electrode to detect the touched position during the touch sensing period.

10. The method of claim 9, further comprising:
    grouping the plurality of gate lines to supply the scan signal to the grouped gate lines according to a horizontal sync signal during the touch sensing period; and
    respectively supplying data voltages representing a grayscale image pattern or data voltages representing a black image pattern to pixels connected to gate lines receiving the scan signal during the touch sensing period.

11. The method of claim 10, further comprising supplying the same data voltage to the pixels connected to the gate lines receiving the scan signal to initialize capacitances of the pixels, connected to the gate lines receiving the scan signal, to the same value during the touch sensing period.

12. The method of claim 9, wherein the initialization data voltage represents a black image pattern.

* * * * *